US010562119B2

(12) United States Patent
Yang et al.

(10) Patent No.: US 10,562,119 B2
(45) Date of Patent: Feb. 18, 2020

(54) MACHINING SYSTEM AND TOOL HOLDING APPARATUS THEREOF

(71) Applicant: General Electric Company, Schenectady, NY (US)

(72) Inventors: Lei Yang, Shanghai (CN); Dong Liu, Shanghai (CN); Renwei Yuan, Shanghai (CN); Jianping Wu, Shanghai (CN); Yuanfeng Luo, Niskayuna, NY (US); Howard Paul Weaver, Mason, OH (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 14/710,992

(22) Filed: May 13, 2015

(65) Prior Publication Data

US 2015/0328705 A1 Nov. 19, 2015

(30) Foreign Application Priority Data

May 15, 2014 (CN) .......................... 2014 1 0221558

(51) Int. Cl.
*B23H 7/26* (2006.01)
*B23H 7/36* (2006.01)

(52) U.S. Cl.
CPC ................ *B23H 7/36* (2013.01); *B23H 7/26* (2013.01)

(58) Field of Classification Search
CPC ... B23H 7/36; B23H 7/26; B23H 9/14; B23H 1/10; B23H 5/02; B23H 7/265;
(Continued)

(56) References Cited

U.S. PATENT DOCUMENTS 3,268,434 A 8/1966 Weingartner
3,668,105 A 6/1972 Abt
(Continued)

FOREIGN PATENT DOCUMENTS

CN 2232814 Y 8/1996
CN 1287515 A 3/2001
(Continued)

OTHER PUBLICATIONS

Unofficial English Translation of Chinese Office Action issued in connection with corresponding CN Application No. 201410221558.2 dated Dec. 1, 2016.
(Continued)

*Primary Examiner* — Dana Ross
*Assistant Examiner* — Joseph M Baillargeon
(74) *Attorney, Agent, or Firm* — Steven M. Shape; Dennemeyer & Associates, LLC

(57) ABSTRACT

A machining system for electromachining a workpiece that in one embodiment includes a machine tool, a cutting tool for performing the eletromachining, and a tool holding apparatus for conductively holding the cutting tool and coupled to the machine tool. The tool holding apparatus includes a holding element for holding the cutting tool and at least one solution releasing element. The solution releasing element is used to receive machining solution and release the machining solution onto a predetermined area of the cutting tool through at least one group of channels. Each group of channels includes at least two channels configured to respectively release the machining solution onto at least two adjacent sections in the predetermined area of the cutting tool.

18 Claims, 7 Drawing Sheets

(58) Field of Classification Search
CPC ....... B23H 3/10; B23Q 11/1023; B23B 31/02; B23B 2231/24
USPC ............ 219/69.15, 69.1, 69.18, 69.12, 69.2, 219/69.17, 69.14, 121.49, 121.54, 69.11, 219/69.13, 69.19; 407/20, 11; 173/61; 83/169; 408/61, 56, 59, 57, 60, 68; 409/135, 137
See application file for complete search history.

(56) References Cited

U.S. PATENT DOCUMENTS

| | | | |
|---|---|---|---|
| 4,557,643 | A | 12/1985 | Cioci |
| 4,575,603 | A | 3/1986 | Inoue et al. |
| 4,648,759 | A | 3/1987 | Ebenhoch |
| 4,739,145 | A | 4/1988 | Check et al. |
| 5,045,663 | A | 9/1991 | Neal et al. |
| 5,190,421 | A * | 3/1993 | Wen ................ B23Q 11/10 184/6.14 |
| 5,197,231 | A | 3/1993 | Pedersen et al. |
| 5,358,360 | A | 10/1994 | Mai |
| 5,414,233 | A | 5/1995 | Fuller et al. |
| 5,416,289 | A | 5/1995 | Tanaka |
| 5,847,348 | A | 12/1998 | Allison |
| 6,211,480 | B1 | 4/2001 | Nagata |
| 6,353,199 | B1 | 3/2002 | Hosaka et al. |
| 6,367,718 | B1 * | 4/2002 | Lotz .................... B22D 11/126 239/556 |
| 6,382,887 | B1 | 5/2002 | Nakai |
| 6,538,227 | B1 | 3/2003 | Sano et al. |
| 6,740,839 | B1 | 5/2004 | Kung et al. |
| 7,002,094 | B2 | 2/2006 | Spitza |
| 8,465,232 | B2 | 6/2013 | Amstibovitsky et al. |
| 8,480,011 | B2 | 7/2013 | Endo |
| 8,544,173 | B2 | 10/2013 | Miller et al. |
| 8,544,765 | B1 | 10/2013 | Cornell et al. |
| 8,561,920 | B2 | 10/2013 | Suhara |
| 8,579,419 | B2 | 11/2013 | Tojo |
| 8,590,816 | B2 | 11/2013 | Ballu |
| 8,784,022 | B2 * | 7/2014 | Leishman ............... B23Q 11/10 409/136 |
| 2005/0247569 | A1 | 11/2005 | Lamphere et al. |
| 2008/0135418 | A1 | 6/2008 | Yuan |
| 2011/0126923 | A1 * | 6/2011 | De Boer ................ F16K 17/196 137/512 |
| 2011/0318123 | A1 | 12/2011 | Leishman |
| 2012/0211357 | A1 | 8/2012 | Trimmer et al. |
| 2012/0285820 | A1 * | 11/2012 | Li .......................... B23H 3/10 204/227 |
| 2015/0174721 | A1 * | 6/2015 | Yeh .................. B23Q 11/1076 409/136 |

FOREIGN PATENT DOCUMENTS

| | | |
|---|---|---|
| CN | 1287516 A | 3/2001 |
| CN | 2925718 Y | 7/2007 |
| CN | 102990172 A | 3/2013 |
| EP | 0103956 A2 | 3/1984 |
| EP | 0547801 A1 | 6/1993 |
| EP | 0904892 B1 | 6/2002 |
| EP | 1462213 A1 | 9/2004 |
| EP | 1640091 A1 | 3/2006 |
| JP | 5424379 A | 2/1979 |
| JP | 61100318 A | 5/1986 |
| JP | H05169322 A | 7/1993 |
| JP | H07031252 U | 6/1995 |
| JP | 10217040 A | 8/1998 |
| JP | 2008142886 A | 6/2008 |
| JP | 2013527038 A | 6/2013 |
| WO | 2011006039 A2 | 1/2011 |

OTHER PUBLICATIONS

European Search Report and Opinion issued in connection with corresponding EP Application No. 15166512.2 dated Sep. 22, 2015.

Lei Li et al., "Influence of flushing on performance of EDM with bunched electrode", The International Journal of Advanced Manufacturing Technology, SpringerLink, Jan. 2012, vol. 58, Issue 1-4, pp. 187-194.

D. W. Rudorff et al., "Principles and Applications of Spark Machining", Proceedings of the Institution of Mechanical Engineers, sage Journals, Jun. 1957 vol. 171 No. 1 495-511.

Mediliyegedara et al., "New Developments in the Process Control of the Hybrid Electro Chemical Discharge Machining (ECRM) Process", Journal of Materials Processing Technology, Volume No. 167, pp. 338-343, 2005.

PCT Search Report and Written Opinion issued in connection with Related PCT Application No. PCT/US2011/021833 dated Apr. 20, 2011.

"The Electrical Discharge Machine for Die and Mould Manufacturing", The Electrical Discharge Machining, pp. 1-3, http://www.completeedm.com/electricaldischargemachine.php retrieved on Feb. 27, 2012.

Chinese Office Action issued in connection with Related CN Application No. 201010104042.1 dated Oct. 9, 2012.

Chinese Office Action issued in connection with Related CN Application No. 201010104042.1 dated Apr. 18, 2013.

U.S. Restriction Requirement issued in connection with Related U.S. Appl. No. 13/574,345 dated Oct. 30, 2013.

U.S. Non-Final Office Action issued in connection with Related U.S. Appl. No. 13/574,345 dated Feb. 13, 2014.

U.S. Notice of Allowance issued in connection with Related U.S. Appl. No. 13/574,345 dated Aug. 6, 2014.

Japanese Office Action issued in connection with Related JP Application No. 2012550107 dated Jan. 6, 2015.

Japanese Notice of Allowance issued in connection with Related JP Application No. 2012550107 dated Aug. 11, 2015.

Hongtao Li et al., Jul. 20, 2012, U.S. Appl. No. 13/574,345.

* cited by examiner

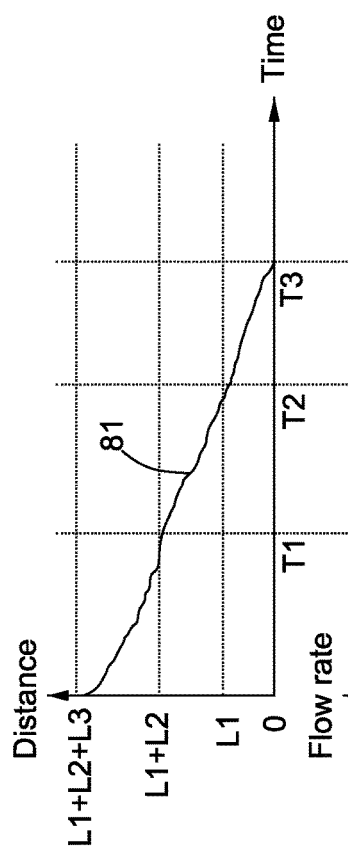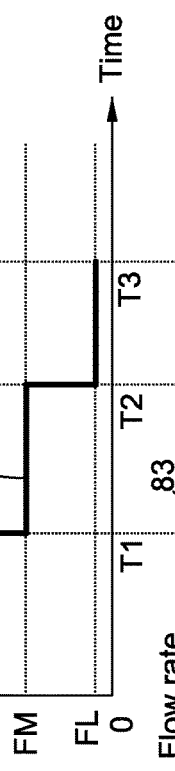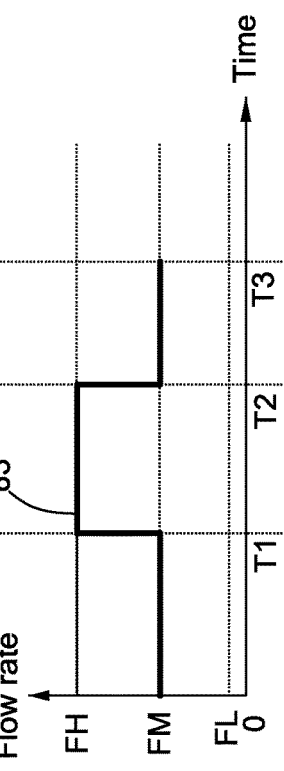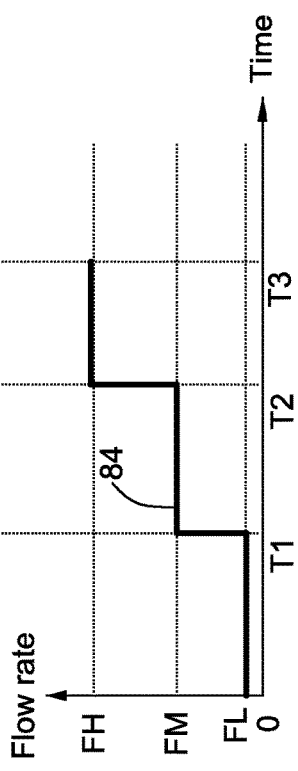
FIG. 8a
FIG. 8b
FIG. 8c
FIG. 8d

MACHINING SYSTEM AND TOOL HOLDING APPARATUS THEREOF

BACKGROUND

This application relates generally to machining systems. More particularly, this application relates to a tool holding apparatus applied on a machining system for electromachining.

Electromachining, such as electro discharge machining (EDM), electrochemical machining (ECM), and electrochemical discharging machining (ECDM) are processes and systems in which an electrode is positioned nearby an electrically conductive workpiece, and an electrical current passes between the electrode and the workpiece to locally process the workpiece to form desired features thereon. A machining solution is released onto the electrode to carry the removed materials away. This noncontact machining has a number of advantages over the contact type machining processes. Typically, the electromachining apparatus has a channel/nozzle that is integrated in a tool holding apparatus that provides for the machining solution to be dispensed. The tool holding apparatus is used to hold the cutting tool that performs the electromachining of the workpiece.

Machining systems, such as computer numerical controlled (CNC) machines (or "machining centers") are widely used for machining workpieces. The noncontact machining provides greater efficiency and lower cutting tool cost. In addition the electromachining is integrated with such machining systems thereby allowing for machining of workpieces having greater hardness.

While there have been attempts to embed or integrate electromachining into the machining systems, mechanisms for performing the electromachining are relatively complex. Furthermore, in conventional machining systems, the use of the machining solution is not very efficient because the machining solution is generally released through only one channel/nozzle without flow rate control.

Therefore, there is a need for a new and improved tool holding apparatus and a machining system employing the tool holding apparatus for electromachining.

BRIEF DESCRIPTION

In accordance with an embodiment of the present invention, a machining system for electromachining a workpiece is provided. The machining system includes a machine tool, a cutting tool for performing the eletromachining, and a tool holding apparatus for conductively holding the cutting tool and coupled to the machine tool. The tool holding apparatus includes a holding element for holding the cutting tool and at least one solution releasing element. The solution releasing element is used to receive machining solution and release the machining solution onto a predetermined area of the cutting tool through at least one group of channels. Each group of channels includes at least two channels configured to respectively release the machining solution onto at least two adjacent sections in the predetermined area of the cutting tool.

In accordance with another embodiment, a tool holding apparatus for holding a cutting tool that performs an electromachining operation on a workpiece is provided. The tool holding apparatus includes a holding element for holding the cutting tool and at least one solution releasing element. The solution releasing element is used to receive machining solution and release the machining solution onto a predetermined area of the cutting tool through at least one group of channels. Each group of channels includes at least two channels configured to respectively release the machining solution onto at least two adjacent sections in the predetermined area of the cutting tool.

DRAWINGS

These and other features, aspects, and advantages of the present invention will become better understood when the following detailed description is read with reference to the accompanying drawings in which like characters represent like parts throughout the drawings, wherein:

FIG. 8a-8d shows three control charts of released machining solution from three channels of the holding apparatus of FIG. 7, together with a distance function chart of a cutting tool.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Figure 1:
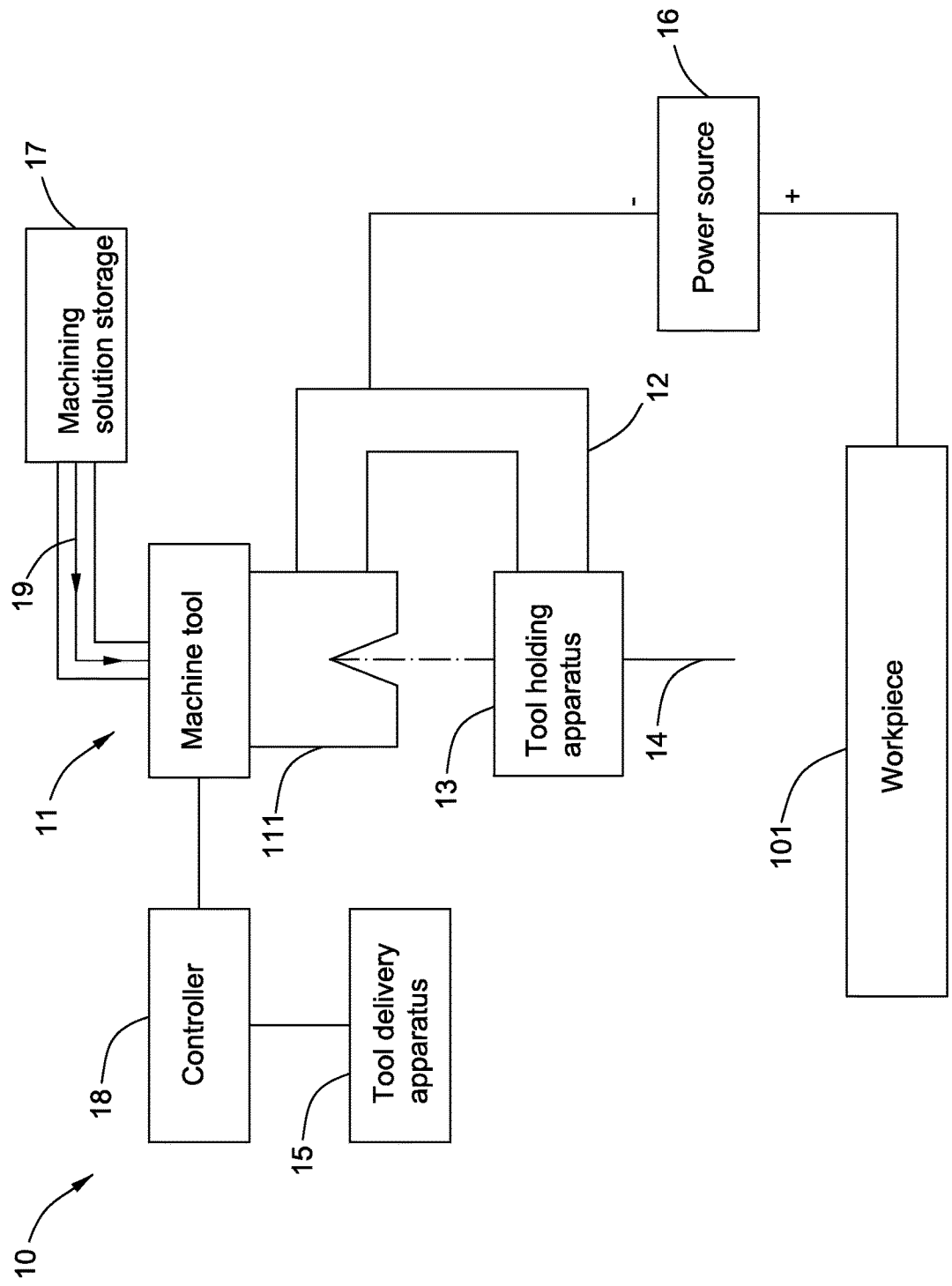
FIG. 1 is a schematic view of a machining system, according to one embodiment, together with a workpiece to be machined.

Referring to FIG. 1, a schematic view of a machining system 10 for machining a workpiece 101, according to one embodiment is shown. In non-limiting examples, the machining system 10 may include a computer numerical controlled (CNC) machine (or "machining center") and may automatically machine the workpiece 101 according to preset control programs therein with a cutting tool 14, which may be optionally carried in a tool storage or magazine of the machining system 10. In certain applications, the tool storage may not be employed.

As an example, the machining system 10 illustrated in FIG. 1 includes a machine tool 11, a tool adapter 12, a tool holding apparatus 13 holding a cutting tool 14, a tool delivery apparatus 15, a power source 16, a machining solution storage 17, and a controller 18. It should be understood that the size, shape and arrangement of the machining system 10 in FIG. 1 is merely illustrative.

In some embodiments of the machining system 10, the tool holding apparatus 13 is coupled to the machine tool 11 for performing desired machining of the workpiece 101. The machining tool 11 may perform certain operations, such as movement in at least one of an x, y, and z direction. In one example, the cutting tool 14 comprises an electrode configured to perform electromachining.

As used herein, the term "electromachining" may comprise electro discharge machining (EDM), electrochemical machining (ECM), electrochemical discharging machining (ECDM), electro arc machining (ECAM) or electroerosion machining. In one non-limiting example, the cutting tool 14 performs ECDM.

As an example, the machine tool 11 illustrated in FIG. 1 includes a spindle 111 used to assemble the tool holding apparatus 13 thereon, such as through the tool adapter 12. As noted, FIG. 1 is merely illustrative and may not have all the cited features. In other embodiments, the connection configuration between the machine tool 11 and the tool holding apparatus 13 can be by using other connection configurations.

In general, during a machining operation, the negative and positive terminals of the power source 16 are respectively electrically coupled to the cutting tool 14 and the workpiece 101. According to a predetermined program, the controller 18 controls the tool delivery apparatus 15 to mount a proper cutting tool 14 into the tool holding apparatus 13, and controls the machine tool 11 to perform movement operations, such as through rotating the spindle 111, to allow the cutting tool 14 to perform electromachining on the workpiece 101.

The machining solution 19 stored in the machining solution storage 17 is released in an area about the cutting tool 14 to flush the materials removed by the cutting tool away. In some embodiments, the machining solution 19 may include electrolytes. In some embodiments, the machining operation may be changed based on different arrangements of the machining system 10 and the desired machining.

In order to achieve an improved and more efficient flushing result when releasing the machining solution 19 on or about the cutting tool 14, the tool holding apparatus 13 incorporates innovative features. In one embodiment, the tool holding apparatus 13 has two or more nozzles that dispense the machining solution 19 onto the cutting tool 14. The nozzles in one example dispense the machining solution 19 along a length of the cutting tool 14 such that as the cutting tool 14 erodes during the electromachining, the cutting tool 14 continues to receive machining solution. As detailed herein, some embodiments of the tool holding apparatus 13 and embodiments to release the machining solution 19 on some areas of the cutting tool 14 more efficiently.

Figure 2:
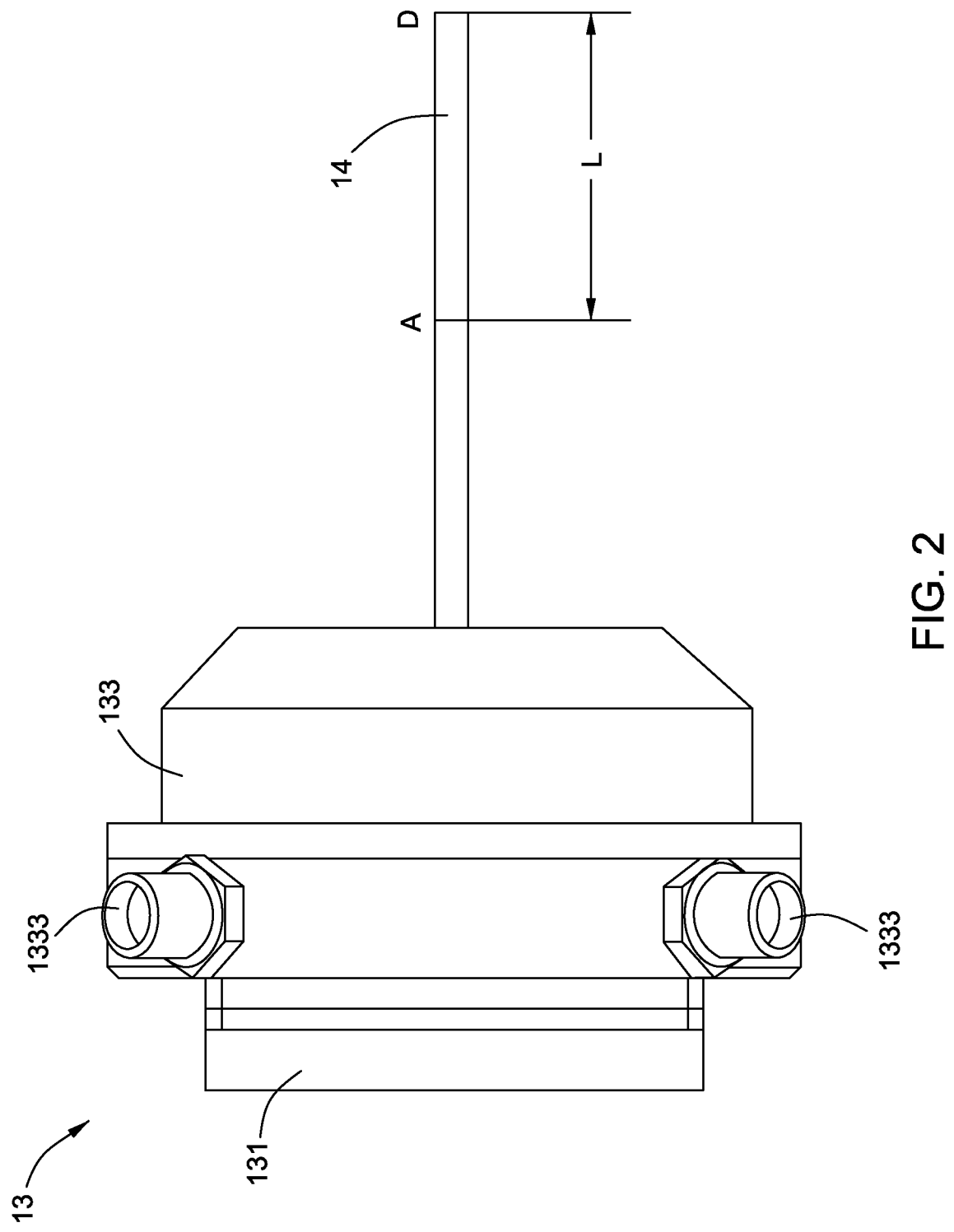
FIG. 2 is a schematic, side view of a tool holding apparatus of the machining system of FIG. 1, together with an electrode held by the tool holding apparatus.
Figure 3:
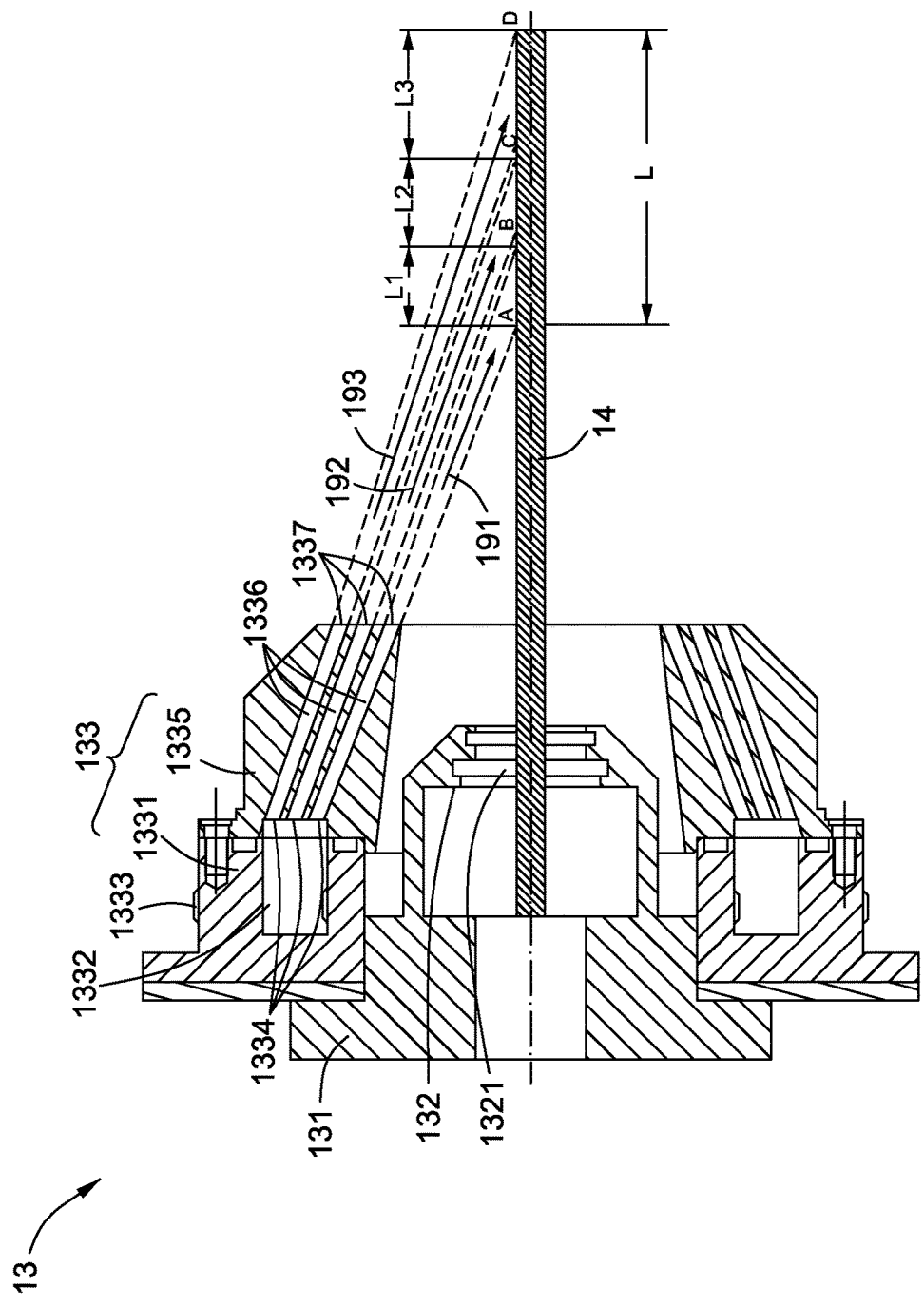
FIG. 3 is a cross-sectional view of the tool holding apparatus of FIG. 2, according to one embodiment.
Figure 4:
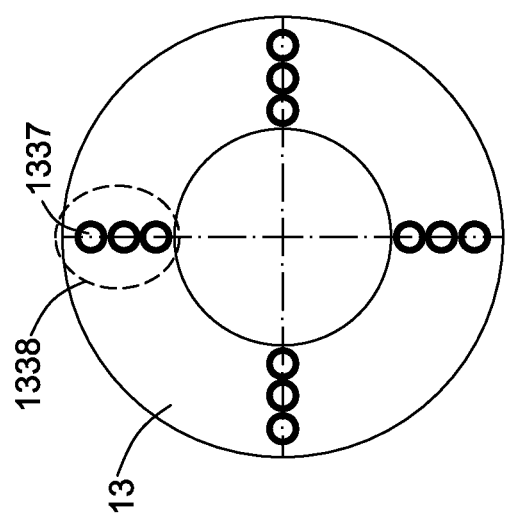
FIG. 4 is a front view of the tool holding apparatus of FIG. 2, according to one embodiment.

FIGS. 2-4 are schematic diagrams of the tool holding apparatus 13, in accordance with one embodiment. The tool holding apparatus 13 includes a connecting element 131, a holding element 132 connected with the connecting element 131, and a number of solution releasing elements 133 about the periphery of the holding element 132.

The connecting element 131 is used to couple the tool holding apparatus 13 onto the spindle 111 such as through the tool adapter 12. The holding element 132 is used to hold the cutting tool 14. The solution releasing element 133 is used to receive the machining solution 19 and release it onto desired areas.

As depicted in FIGS. 2 and 3, the holding element 132 is cylindrical shape, and matches with the spindle 111. The connection modes between the connecting element 131 and the spindle 111 may use conventional connections modes through the tool adapter 12, which are not described in detail.

For holding the cutting tool 14, the holding element 132 includes an adjustable clamping part 1321, which can clamp different sizes of cutting tools 14 flexibly. In other embodiments, the clamping mode of the holding element 132 can also be a mechanism as known to those skilled in the art. It is understood that the clamping part 1321 may use conventional clamping modes to hold the cutting tool 14, which are not described in detail.

As depicted in FIGS. 2-4, the solution releasing element 133 is arranged around some or all of the holding element 132. The solution releasing element 133 includes a receiving part 1331 and a releasing part 1335. As shown, the releasing part 1335 is coupled to mate with the solution releasing elements 133. The receiving part 1331 is used to receive the machining solution 19 from the machining solution storage 17, to provide a buffering for the machining solution 19 before releasing. The releasing part 1335 is used to release and direct the machining solution 19 onto the cutting tool 14 from the receiving part 1331. In some embodiments, the receiving part 1331 may be omitted, and thus the releasing part 1335 will directly receive the machining solution 19 from the machining solution storage 17 and then release the machining solution 19 onto the cutting tool 14.

In the illustrated embodiment, the receiving part 1331 includes at least one container 1332. The container 1332 is used to receive the machining solution 19, such as through at least one pipe 1333. As an example, the number of the containers 1332 is four and the number of the pipes 1333 is four (only two pipes 1333 are shown in FIGS. 2 and 3). In one example, the four pipes 1333 are evenly arranged about the circumference of the receiving part 1331.

In the illustrated embodiment, the releasing part 1335 includes multiple groups of channels 1336, such as four groups corresponding to the four containers 1332 (FIG. 3 only shows two containers 1332). The multiple groups of channels 1336 in one embodiment are the same, and thus only one group thereof is described in detail herein.

In one example, each group of channels 1336 includes multiple channels side by side, such as three channels 1336 which are coupled to the corresponding containers 1332. For example, when the machining solution 19 is transferred into the container 1332 through the corresponding pipe 1333 and for a predetermined capacity, the contained machining solution 19 will be released through the channels 1336 from inner openings 1334 to outer openings 1337. In one example, the distance between the cutting tool 14 and the inner openings 1334 is greater than the distance between the cutting tool 14 and the outer openings 1337.

In more particular detail of one embodiment, an extension line of each channel 1336 has a slant angle with the cutting tool 14, therefore when the machining solution 19 is released from the openings 1337 of the channels 1336, the released machining solution 191, 192, and 193 will respectively cover three adjacent sections A-B, B-C, and C-D on the cutting tool 14. And the total distance from point 'A' to point 'D' is a predetermined machining length L. In other words, during a machining process, the cutting tool 14 will be gradually worn out from the tip point 'D' to the set point 'A', then a new cutting tool 14 will be inserted into the holding element 132 to continue the subsequent machining process.

Because the releasing passageway of each group of channels 1336 of the releasing part 1335 is divided into multiple channels, such as illustrated by the three channels 1336, the predetermined machining length L is divided into three parts L1, L2, and L3, namely L=L1+L2+L3. Compared with conventional single channel design, the multiple channels design provides a longer machining life for the matching length L. By providing a sufficient flow rate of solution on the cutting tool, the cutting tool lasts a longer time. In other embodiments, the number of the channels 1336 of each group of channels can be changed. For example, if a desired machining length L is very long, then the number of the channels may be more than three. Furthermore, the releasing direction of released machining solutions 191, 192, 193 can also be adjusted through adjusting the arrangement of the channels 1336 in each group of channels.

FIG. 4 depicts one embodiment of the tool holding apparatus 13 having multiple groups 1338 of channels 1336 as shown by the openings 1337. In this example the groups 1338 of channels 1336 are symmetrically arranged about the circumference of the holding tool apparatus 13. Further the channels 1336 are arranged in a linear fashion extending from the interior to the exterior of the holding tool apparatus 13. These channels 1336 would therefore provide four streams of the machining solution 19 onto the cutting tool 14 through the openings 1337.

Figure 6:
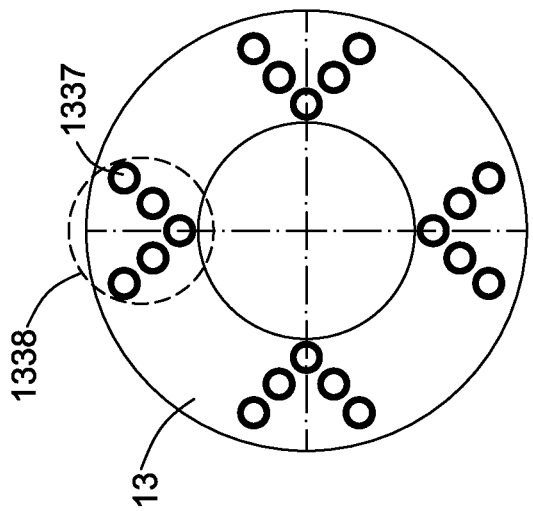
FIG. 6 is a front view of the tool holding apparatus of FIG. 2, according to yet another embodiment.
Figure 5:
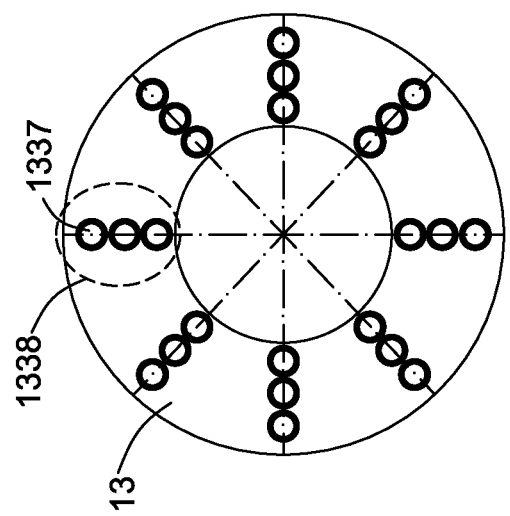
FIG. 5 is a front view of the tool holding apparatus of FIG. 2, according to another embodiment.

As shown in FIGS. 5 and 6, two other embodiments of the tool holding apparatus 13 are introduced as examples. FIG. 5 shows eight groups 1338 of channels 1336, which further increases the flushing effect. The channels 1336 are symmetrically arranged about the holding tool apparatus 13 to provide a uniform flow of the machining solution 19.

FIG. 6 shows another group 1338 of channels which includes five channels 1336 arranged as a 'V' shape. In non-limiting embodiments, the number and the arrangement of the channels 1336 can be changed according to different flushing needs and design requirements.

Figure 7:
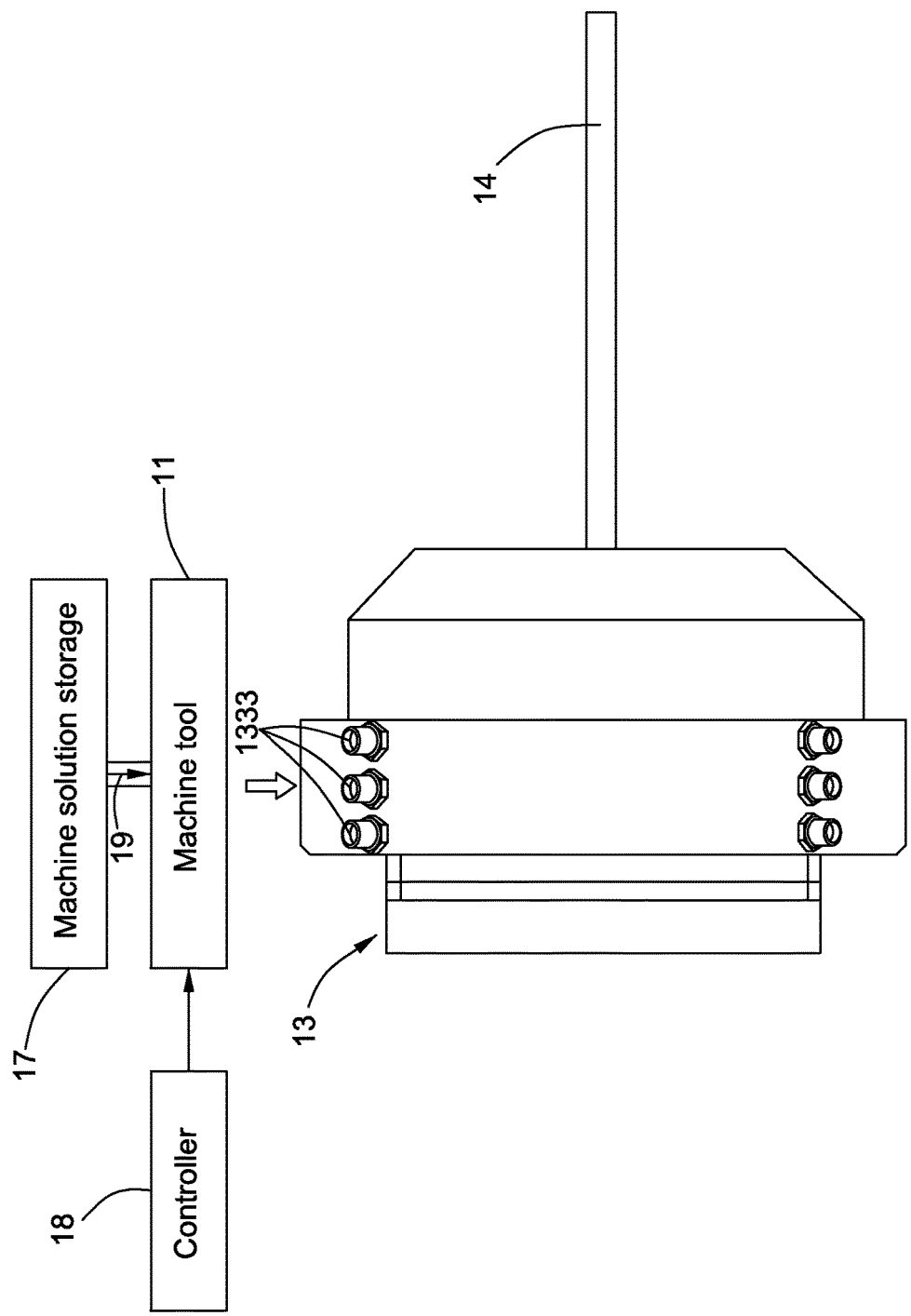
FIG. 7 is partial schematic view of the machining system of FIG. 1, together with a schematic side view of a tool holding apparatus of the machining system according to another embodiment.

Referring to FIG. 7, a partial schematic view of the machining system 10, together with a schematic, side view of the tool holding apparatus 13, according to another embodiment is shown. Compared with above embodiments, the tool holding apparatus 13 of this illustrated embodiment of FIG. 7 changes the single pipe 1333 shown in FIG. 2 to three pipes 1333 which are respectively coupled to the three channels 1336. In addition, the controller 18 respectively controls the flow rate of the machining solution 19 into the three channels 1336 through the three pipes 1333.

For achieving a more effective flushing process of releasing the machining solution 19 onto the cutting tool 14, the control process of the flow rate of the machining solution 19 may be programmed in the controller 18 in advance or in another example it can be varied by the user according to the cutting requirements and materials.

As an example, FIGS. 8*a*-8*d* shows control charts of released machining solution from three channels of the holding apparatus 13 of FIG. 7, together with a distance function chart of a cutting tool. These charts are based on the theoretical calculations. FIGS. 8*b*-8*d* shows three control charts (curves 82, 83, 84) of the released machining solution 193, 192, 191 from the three channels 1336 of the holding apparatus 13 of FIG. 7, together with a distance function chart (curve 81) from FIG. 8*a* of the cutting tool 14.

From FIG. 8*a*, referring to the distance function chart of the cutting tool 14 first, the curve 81 shows the distance function of the cutting tool 14 with time. For example, when a machining process is at a zero time point 0, the cutting tool 14 is complete. When a machining process is at a first time point T1, the section D-C (length L3 shown in FIG. 3) of the cutting tool 14 is worn out. When the machining process is at a second time point T2, the section C-B (length L2) of the cutting tool 14 is further worn out. And when the machining process is at a third time point T3 (the whole process ends), the section B-A (length L1) of the cutting tool 14 is further worn out.

According to the curve 81, the flow rate of the machining solution 19 in the three channels 1336 are respectively controlled by the controller 18. In the illustrated embodiment of FIG. 8*b*-8*d*, the flow rate may be controlled at three frequency points, FH, FM, FL, and FH>FM>FL. For example, for the released machining solution 193, a control curve 82 is programmed in the controller 18. During a first control phase 0-T1, the flow rate of the released machining solution 193 is controlled as the highest frequency FH, because the section D-C is working during the first control phase 0-T1. During a second control phase T1-T2, the flow rate of the released machining solution 193 is controlled as the midterm frequency FM, because the section C-B is working during the second control phase T1-T2 and the demand of the released machining solution 193 is reduced. During a third control phase T2-T3, the flow rate of the released machining solution 193 is controlled as the lowest frequency FL, because the section B-A is working during the third control phase T2-T3 and the demand of the released machining solution 193 is further reduced.

Similar to the control of the released machining solution 193, the other two released machining solution 192, 191 also can be controlled according to different control demands. As an example, FIG. 8*c*-8*d* shows two corresponding control curves 83 and 84 to respectively control the released machining solution 192, 191, which are not described in detail. In other embodiments, the control curves 82, 83, 84 can be adjusted according to different demands of the released machining solution 193, 192, 191.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

The invention claimed is:

1. A machining system for electromachining a workpiece, the machining system comprising:
   a machine tool;
   a cutting tool for performing the electromachining; and
   a tool holding apparatus for conductively holding the cutting tool and coupled to the machine tool, the tool holding apparatus comprising:
      a holding element for holding the cutting tool; and
      at least one solution releasing element comprising a receiving part and a releasing part, wherein the releasing part comprises multiple groups of channels, wherein each of the multiple groups of channels includes at least two channels having a respective slant angle with respect to the cutting tool, wherein a first channel of the at least two channels is configured to release and deliver a machining solution at a first flow rate onto a first section along a length of the cutting tool in a predetermined area of the cutting tool and a second channel of the at least two channels is configured to release and deliver the machining solution at a second flow rate onto a second section along the length of the cutting tool in the predetermined area of the cutting tool, and wherein channels of at least one group among the multiple groups of channels are arranged to form a 'V' shape; and
   a controller operatively coupled to the tool holding apparatus and configured to control the first flow rate and the second flow rate, wherein during a first control phase the first flow rate is controlled by the controller at a first frequency and during a second control phase the first flow rate is controlled by the controller at a second frequency different from the first frequency.

2. The machining system of claim 1, wherein the machine tool further comprises a spindle, and wherein the tool holding apparatus is coupled to the spindle of the machine tool.

3. The machining system of claim 2, wherein the tool holding apparatus further comprises a cylindrical-shaped connecting element for connecting the tool holding apparatus on the spindle of the machine tool, and wherein the holding element is cylindrical-shaped and connected to the cylindrical-shaped connecting element coaxially.

4. The machining system of claim 3, wherein the at least one solution releasing element is about a periphery of the holding element.

5. The machining system of claim 4, wherein the receiving part is for receiving the machining solution and the releasing part is for releasing the received machining solution onto the predetermined area of the cutting tool.

6. The machining system of claim 5, wherein a number of the multiple groups of channels is even, and the multiple groups of channels are evenly arranged in a circumference of the releasing part.

7. The machining system of claim 5, wherein the receiving part comprises at least one container corresponding to at least one group of the multiple groups of channels, and each container is for receiving the machining solution through a pipe.

8. The machining system of claim 5, wherein the receiving part comprises at least one container corresponding to at least one group of the multiple groups of channels, and each container is for receiving the machining solution through at least two pipes respectively communicated with the at least two channels of a corresponding group of the multiple group of channels.

9. The machining system of claim 1, wherein the first flow rate is controlled at a predetermined highest frequency based on a section of the cutting tool that is under operation.

10. The machining system of claim 1, wherein a number of channels in each of the multiple groups of channels is three.

11. A tool holding apparatus for holding a cutting tool that performs an electromachining operation on a workpiece, the tool holding apparatus comprising:
   a holding element for holding the cutting tool; and
   at least one solution releasing element comprising a receiving part and a releasing part,
   wherein the releasing part comprises multiple groups of channels, wherein each of the multiple groups of channels includes at least two channels having a respective slant angle with respect to the cutting tool, wherein a first channel of the at least two channels is configured to release and deliver a machining solution at a first flow rate onto a first section along a length of the cutting tool in a predetermined area of the cutting tool and a second channel of the at least two channels is configured to release and deliver the machining solution at a second flow rate onto a second section along the length of the cutting tool in the predetermined area of the cutting tool, and wherein channels of at least one group among the multiple groups of channels are arranged to form a 'V' shape, and
   wherein a controller operatively coupled to the tool holding apparatus is configured to control the first flow rate and the second flow rate, wherein during a first control phase the first flow rate is controlled by the controller at a first frequency and during a second control phase the first flow rate is controlled by the controller at a second frequency different from the first frequency.

12. The tool holding apparatus of claim 11, wherein the tool holding apparatus further comprises a cylindrical-shaped connecting element for connecting the tool holding apparatus on a machine tool, wherein the holding element is cylindrical-shaped and connected to the cylindrical-shaped connecting element coaxially.

13. The tool holding apparatus of claim 12, wherein the at least one solution releasing element is about a periphery of the holding element.

14. The tool holding apparatus of claim 11, wherein the receiving part is for receiving the machining solution and the releasing part is for releasing the received machining solution onto the predetermined area of the cutting tool.

15. The tool holding apparatus of claim 14, wherein the receiving part comprises at least one container corresponding to at least one group of the multiple groups of channels, and each container is for receiving the machining solution through a pipe.

16. The tool holding apparatus of claim 14, wherein the receiving part comprises at least one container corresponding to at least one group of the multiple groups of channels, and each container receives the machining solution through at least two pipes respectively communicated with the at least two channels of a corresponding group of the multiple group of channels.

17. The tool holding apparatus of claim 11, wherein the first flow rate is controlled at a predetermined highest fate-frequency based on a section of the cutting tool that is under operation.

18. The tool holding apparatus of claim 11, wherein the at least two channels of each group of the multiple groups of channels are arranged in a linear fashion along a radial direction extending from an interior to an exterior of the tool holding apparatus.

\* \* \* \* \*